(12) United States Patent
Huebner (10) Patent No.: US 8,564,151 B1
(45) Date of Patent: Oct. 22, 2013

(54) SYSTEM AND METHOD FOR GENERATING ELECTRICITY

(76) Inventor: Robert L. Huebner, Santa Anna, TX (US)

( * ) Notice: Subject to any disclaimer, the term of this patent is extended or adjusted under 35 U.S.C. 154(b) by 0 days.

(21) Appl. No.: 13/587,013

(22) Filed: Aug. 16, 2012

(51) Int. Cl.
*F03B 13/12* (2006.01)

(52) U.S. Cl.
USPC ............................................. 290/53; 290/42

(58) Field of Classification Search
USPC ....................................................... 290/42, 53
See application file for complete search history.

(56) References Cited

U.S. PATENT DOCUMENTS

| | | | | |
|---|---|---|---|---|
| 3,204,110 A * | 8/1965 | Masuda | ........................ | 290/42 |
| 4,210,821 A * | 7/1980 | Cockerell | ........................ | 290/53 |
| 4,301,377 A | 11/1981 | Rydz | | |
| 4,524,283 A * | 6/1985 | Latvus | ........................ | 290/1 E |
| 4,636,141 A | 1/1987 | Sedlacek | | |
| 4,864,152 A * | 9/1989 | Pedersen | ........................ | 290/53 |
| 5,132,550 A * | 7/1992 | McCabe | ........................ | 290/53 |
| 5,430,332 A * | 7/1995 | Dunn, Jr. | ........................ | 290/54 |
| 5,440,175 A * | 8/1995 | Mayo et al. | ........................ | 290/54 |
| 6,551,053 B1 | 4/2003 | Schuetz | | |
| 6,734,576 B2 * | 5/2004 | Pacheco | ........................ | 290/55 |
| 7,042,113 B2 | 5/2006 | Aukon | | |
| 7,063,579 B2 * | 6/2006 | Voves | ........................ | 440/3 |
| 7,081,690 B2 | 7/2006 | Coman | | |
| 7,223,137 B1 | 5/2007 | Sosnowski | | |
| 7,375,437 B2 * | 5/2008 | Peckham | ........................ | 290/54 |
| 7,462,949 B2 * | 12/2008 | Coman | ........................ | 290/54 |
| 7,525,207 B2 * | 4/2009 | Clidaras et al. | ........................ | 290/43 |
| 7,969,034 B2 * | 6/2011 | Winius | ........................ | 290/54 |
| 8,106,527 B1 | 1/2012 | Carr | | |
| 8,129,855 B1 * | 3/2012 | Tong et al. | ........................ | 290/54 |
| 8,304,925 B2 * | 11/2012 | Yang et al. | ........................ | 290/42 |
| 8,314,506 B2 * | 11/2012 | Rhinefrank et al. | ........................ | 290/53 |
| 2002/0195823 A1* | 12/2002 | Aguirre | ........................ | 290/53 |
| 2008/0303284 A1 | 12/2008 | Clemens | | |
| 2009/0315330 A1* | 12/2009 | Dederick | ........................ | 290/53 |
| 2009/0322091 A1* | 12/2009 | Jack | ........................ | 290/53 |
| 2009/0322092 A1* | 12/2009 | Werjefelt | ........................ | 290/53 |
| 2009/0322093 A1 | 12/2009 | Winius | | |
| 2010/0013228 A1* | 1/2010 | Duggleby et al. | ........................ | 290/53 |
| 2010/0038913 A1* | 2/2010 | Svelund | ........................ | 290/53 |
| 2010/0084870 A1* | 4/2010 | Burcik | ........................ | 290/54 |
| 2010/0102562 A1* | 4/2010 | Greenspan et al. | ........................ | 290/53 |
| 2010/0123316 A1 | 5/2010 | Fowler | | |
| 2010/0176595 A1* | 7/2010 | Bear et al. | ........................ | 290/53 |
| 2010/0181773 A1* | 7/2010 | Reist | ........................ | 290/54 |
| 2010/0242826 A1* | 9/2010 | Koivusaari et al. | ........................ | 114/333 |
| 2010/0283250 A1* | 11/2010 | Capone et al. | ........................ | 290/54 |

(Continued)

*Primary Examiner* — Tulsidas C Patel
*Assistant Examiner* — Viet Nguyen
(74) *Attorney, Agent, or Firm* — Jack D. Stone, Jr., Esq.; Scheef & Stone, L.L.P.

(57) ABSTRACT

A system and method for generating electric power includes a barge with a frame mounted thereon. A paddlewheel is rotationally mounted on one end of the barge to provide rotational torque to a first transmission. The first transmission drives a hydraulic pump for pumping hydraulic fluid to a hydraulic motor. The hydraulic motor drives a second transmission which is operable to drive an electric generator for generating electricity. During operation, the force of naturally flowing water turns the paddlewheel. This in turn provides rotational power to drive the transmissions, hydraulic pump and hydraulic motor. The frame may further be divided into two hingedly connected portions. One portion of the frame may be rotated out of the water to control the turning of the paddlewheel as well as perform maintenance on the paddlewheel.

15 Claims, 6 Drawing Sheets

(56) References Cited

U.S. PATENT DOCUMENTS

| | | |
|---|---|---|
| 2010/0327597 A1 | 12/2010 | Patel |
| 2011/0031753 A1 | 2/2011 | Moore et al. |
| 2011/0042954 A1* | 2/2011 | Werjefelt ................ 290/53 |
| 2011/0049898 A1* | 3/2011 | Larsen ................... 290/53 |
| 2011/0057447 A1* | 3/2011 | Iglesias Rodriguez et al. 290/53 |
| 2011/0101697 A1 | 5/2011 | Power, III et al. |
| 2011/0121572 A1* | 5/2011 | Levchets et al. ......... 290/53 |
| 2011/0304144 A1* | 12/2011 | Dehlsen et al. .......... 290/53 |
| 2012/0001431 A1* | 1/2012 | Smith ..................... 290/53 |
| 2012/0019003 A1* | 1/2012 | Hu ......................... 290/53 |
| 2012/0074702 A1* | 3/2012 | Ahdoot ................... 290/53 |
| 2012/0104761 A1* | 5/2012 | Vamvas ................... 290/53 |
| 2012/0153627 A1* | 6/2012 | Jo .......................... 290/53 |
| 2013/0038064 A1* | 2/2013 | Azpiroz Villar ......... 290/53 |
| 2013/0043682 A1* | 2/2013 | Rhinefrank et al. ..... 290/53 |
| 2013/0113214 A1* | 5/2013 | McGrath ................. 290/53 |
| 2013/0140821 A1* | 6/2013 | Sapir ...................... 290/50 |

\* cited by examiner

SYSTEM AND METHOD FOR GENERATING ELECTRICITY

TECHNICAL FIELD OF INVENTION

The invention relates generally to a system and method for generating electricity and, more particularly, to a system and method for generating electricity through the use of a paddlewheel attached to a barge, wherein the force of running water is utilized to turn the paddlewheel, and correspondingly to turn an electric generator which generates electricity.

BACKGROUND OF THE INVENTION

In many areas, there are flowing bodies of water such as streams and rivers where a continuous, natural source of flowing water is readily and constantly available. These bodies of water typically flow towards larger bodies of water such as a lake or an ocean at a substantially low flow speed, such as in the range of 3-4 miles per hour. This speed of the water flow is generally consistent, save for the initial flow from an upstream source such as where the water source originates from melting snow or ice high up on a mountain or some other higher altitude location. Such water flow can have a tremendous amount of force and kinetic energy that is currently being underutilized or not utilized at all; however, the water flow may be harnessed and converted into other forms of energy, such as electricity, that are more practical and commonly utilized by people.

In the past, it has been common practice to build levees or dams and the like to better control the flow of water and then build a hydroelectric power plant immediately downstream of the water control structure. However, such infrastructure is necessarily expensive and time consuming to build and set up. Further, such hydroelectric power plants must be run by trained and dedicated engineers and other professionals, making the cost of generating hydroelectric power simply out of the reach of most smaller towns and municipalities.

Thus, what has been lacking in the field of hydroelectric power is the ability to inexpensively and efficiently generate electric power on a smaller, more economic scale wherein smaller towns and municipalities located near large flowing bodies of water may generate electric power for personal consumption and may also sell excess power to larger power grids and networks.

In view of the foregoing, what is therefore needed is a relatively inexpensive hydroelectric power generating system that can be easily set up along a river or stream to harness the natural flow of water for generating electric power on a relatively small scale, and that can be operated without the need for highly trained staff and technicians to constantly maintain and support the generator.

SUMMARY OF THE INVENTION

The present invention addresses these problems by providing a relatively inexpensive hydroelectric power generator that may be easily set up and utilized on the bank of a stream or river, and is operable to generate relatively small amounts of electric power sufficient for use by small towns and municipalities. Because the invention utilizes a natural, freely available, and generally continuous power source, the operating costs of the present invention are very low, generally requiring only the initial investment for the generator itself as well as minimal upkeep.

The invention preferably comprises a conventional barge that has been modified to provide a paddlewheel on one side for harnessing the kinetic power provided by the flowing water of a river. In one preferred embodiment, the paddlewheel is coupled to a hydraulic motor, which is coupled to a transmission, which in turn is coupled to an electric generator for generating electric power. The barge may be tethered to the river bank to keep the invention generally stationary. Power lines originating from the electric generator are provided to transport the generated electric power to other facilities for further storage or consumption.

In one preferred embodiment of the present invention, a large diameter paddlewheel is attached to a first side of the barge. The paddlewheel is fixedly connected to the barge such that the paddlewheel may freely rotate without altering the axis of rotation relative to the barge. The paddlewheel is attached to the barge such that a lower portion of the paddlewheel is continuously below the water line when the axis of rotation is substantially horizontal. A debris shield may be optionally attached below the water line and adjacent the paddlewheel in order to block the flow of potentially harmful debris into the paddles of the paddlewheel. The paddlewheel includes a drive shaft, which is coupled to a transmission for selectively adjusting the revolutions per minute (RPM) of the drive shaft. The transmission is rotatably coupled to a hydraulic pump for controlling hydraulic fluid levels to a hydraulic motor. A hydraulic fluid reservoir may be made available for bypass of hydraulic fluid between the pump and motor. The hydraulic motor is rotationally coupled to another drive shaft and transmission. The transmission connected to the hydraulic motor may be used to control the RPM of the rotational drive shaft. An electric generator is rotationally connected to the transmission for generating electric power.

In other embodiments of the invention, the barge includes a frame mounted to the top thereof. The frame is divided into two portions hingedly joined at a central location, which bisects the frame into a first section comprising the paddlewheel, first transmission and hydraulic pump, and a second section comprising the hydraulic motor, hydraulic fluid reservoir, second transmission, and electric generator. In this embodiment of the invention, two upright supports with one support located on each of two portions of the barge may be connected by a guy wire attached to a winch. When the winch is reeled to pull in the guy wire, the first section of the frame is forcibly lifted at the hinge, such that the end of the barge containing the paddlewheel may be angularly lifted out of the water, either partially or totally. By being able to control how much of the paddlewheel is in the water, the turning of the paddlewheel, as well as the generation of electric power, may be controlled, and periodic maintenance of the paddlewheel itself is facilitated. A solar panel and battery may optionally be provided on the barge for powering the electric winch.

In a still further embodiment and variation of the invention, utilizing the hinged frame mounted on a barge as described above, the paddlewheel is coupled to a gearbox that is coupled via a drive shaft to the electric generator. The gearbox includes a clutch that may be used to disengage the paddlewheel from the shaft so that the shaft may be detached from the gearbox and the portion of the hinged frame proximate to the paddlewheel rotated upwardly until the paddlewheel is out of the water. In a variation of this embodiment, the hinge of the frame is elevated and the shaft includes a U-joint which is rotatable about the same axis as the hinge of the frame, so that the portion of the hinged frame proximate to the paddlewheel is rotated upwardly without detaching the shaft from the gearbox.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

Figure 1:
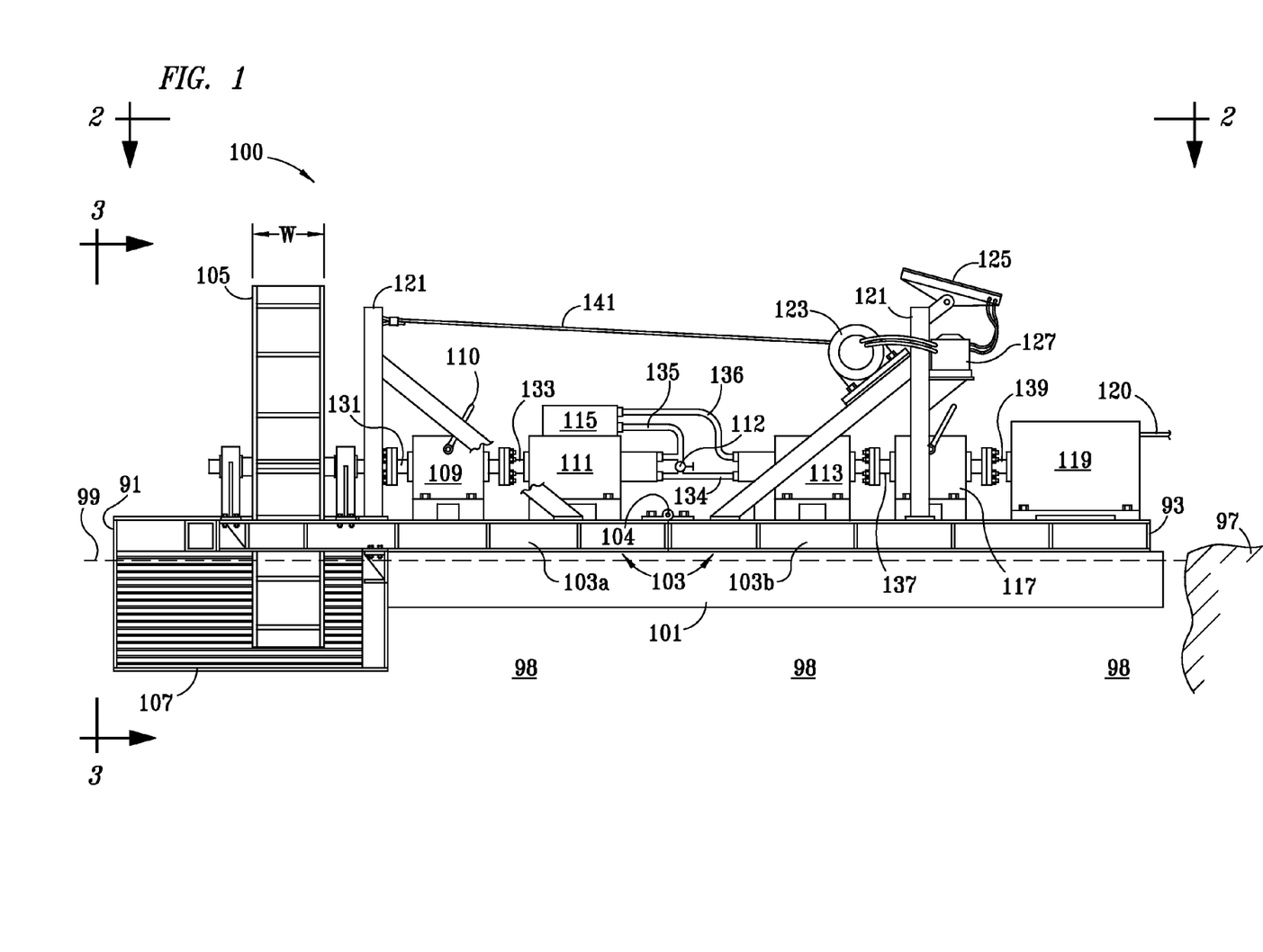
FIG. 1 is a frontal elevation view of a system embodying features of the present invention for generating electric power.

Referring to FIG. 1, there is shown a frontal elevation view of a system 100 embodying features of the present invention. The system 100 includes a river barge or floating barge 101 for providing flotation of the system 100 during operation, and may be floated in a river having a body of water 98, near a river bank or other land mass 97. Preferably, the system 100 is anchored to a river bed (not shown) to prevent the system 100 from relocating due to the flow of the river. A frame 103 is preferably mounted to the top of the barge 101 for supporting the equipment of the system 100. The barge 101 preferably provides sufficient flotation of the system 100 such that a water line 99 rises to generally near the top of the barge 101, but preferably does not rise to the level of the frame 103. In a preferred embodiment of the present invention, the frame 103 comprises first and second frame portions 103a and 103b, respectively, coupled together via an optional hinge 104 which generally bisects the frame 103. The frame portions 103a and 103b may be hingedly connected via the hinge 104 so as to provide for the first portion 103a to rotate in relation to the second portion 103b. The purpose for the hinged connection of the two portions of the frame 103 is discussed in greater detail below.

A paddlewheel 105 is rotatably mounted at a first end 91 of the frame 103, opposite a second end 93 abutting the land mass 97. The paddlewheel 105 may be of any suitable diameter and width to accommodate the capture of the flow of water 98 from the river or other flowing body of water 98, and is preferably sized to generate sufficient torque for driving an electric generator that generates a desired amount of electric power. The paddlewheel 105 is rotatably mounted to the frame 103 via bolting or other suitable fastening means such that the paddlewheel 105 may freely rotate, but remain axially affixed to the frame 103. A debris shield 107 is preferably positioned below the water line 99 and immediately adjacent to and upstream of the paddlewheel 105 for preventing debris 96 (FIG. 3) and other unwanted particles that may be present in the water 98 from accumulating and otherwise interfering with the operation of the paddlewheel 105. The debris shield 107 is preferably constructed of rigid, corrosion-resistant materials that allow for the free flow of the water 98 in the direction of arrows 92 (FIG. 3) through the shield 107, yet prevent debris 96 and other particle matter from reaching the paddlewheel 105.

The paddlewheel 105 is preferably axially mounted and rotationally connected via a drive shaft 131 to a first transmission 109. The first transmission 109 includes a gearbox and clutch, and suitable control means, exemplified by the handle 110, for operating the gearbox and clutch. Because the paddlewheel 105 may generate a relatively large amount of torque, albeit at low RPM, the first transmission 109 is utilized to convert the high torque/low RPM provided by paddlewheel 105 into lower torque, higher RPMs for improved manageability. The lower torque at the higher RPM provided by the first transmission 109 may be transmitted through a secondary drive shaft 133 to power a hydraulic pump 111, which in turn pumps hydraulic fluid to a hydraulic motor 113 via hydraulic fluid lines 135 and 136. Due to the nature of the potentially great amount of torque and rotational power being provided by the paddlewheel 105, it may be necessary to provide a bypass for the hydraulic fluid being provided to hydraulic motor 113. Thus, a bypass valve 112 interposed in fluid communication between inlet and outlet lines of the hydraulic pump 111, and a hydraulic fluid reservoir 115 which may be interconnected between the hydraulic pump 111 and the hydraulic motor 113, are preferably provided, which valve and reservoir may be utilized separately or in combination, in order to provide a bypass of the hydraulic fluid and to enable an operator to better control the function of the hydraulic motor 113.

The hydraulic motor 113 is preferably rotationally connected to a second transmission 117 via a third drive shaft 137. The second transmission 117 functions in similar fashion to the first transmission 109, controlling the increase and decrease of torque and RPMs of the drive shaft 137. The second transmission 117 is rotationally connected to a fourth drive shaft 139 which is rotationally coupled to an electric generator 119. Thus, through the use of multiple transmissions and drive shafts, the optimal amount of torque and RPMs may be converted from the paddlewheel 105 to the electric generator 119 for optimally and most efficiently driving the generator. The electric generator 119 may be any electric generator suitable for mounting atop the frame 103 of the system 100. The power generated by the electric generator 119 may be transferred to a different location for use or consumption via power transmission lines 120.

The first transmission 109, hydraulic pump 111, hydraulic motor 113, hydraulic fluid reservoir 115, second transmission 117, and electric generator 119 are considered to be well-known in the art, and are therefore not discussed in further detail herein, except insofar as necessary to describe the invention.

In further and alternative embodiments of the invention, the system 100 may optionally include a pair of upright supports 121 with one support located on each portion (103a and 103b) of the frame 103 for lifting the first portion 103a of the frame 103, as discussed in further detail below with respect to FIG. 4. Each upright support 121 preferably comprises at least one vertical post along with a diagonal support member. In other embodiments, the upright supports 121 comprise multiple posts to further increase the sturdiness of the upright supports 121. The upright supports 121 may optionally be located about equidistant from the hinge 104, and are preferably rigidly secured to the frame 103. A winch 123 is preferably attached to one of the upright supports 121 and may be connected to a guy wire 141 that connects the opposing upright support. An optional solar panel 125 and battery 127 may be used to power the winch 123.

Figure 2:
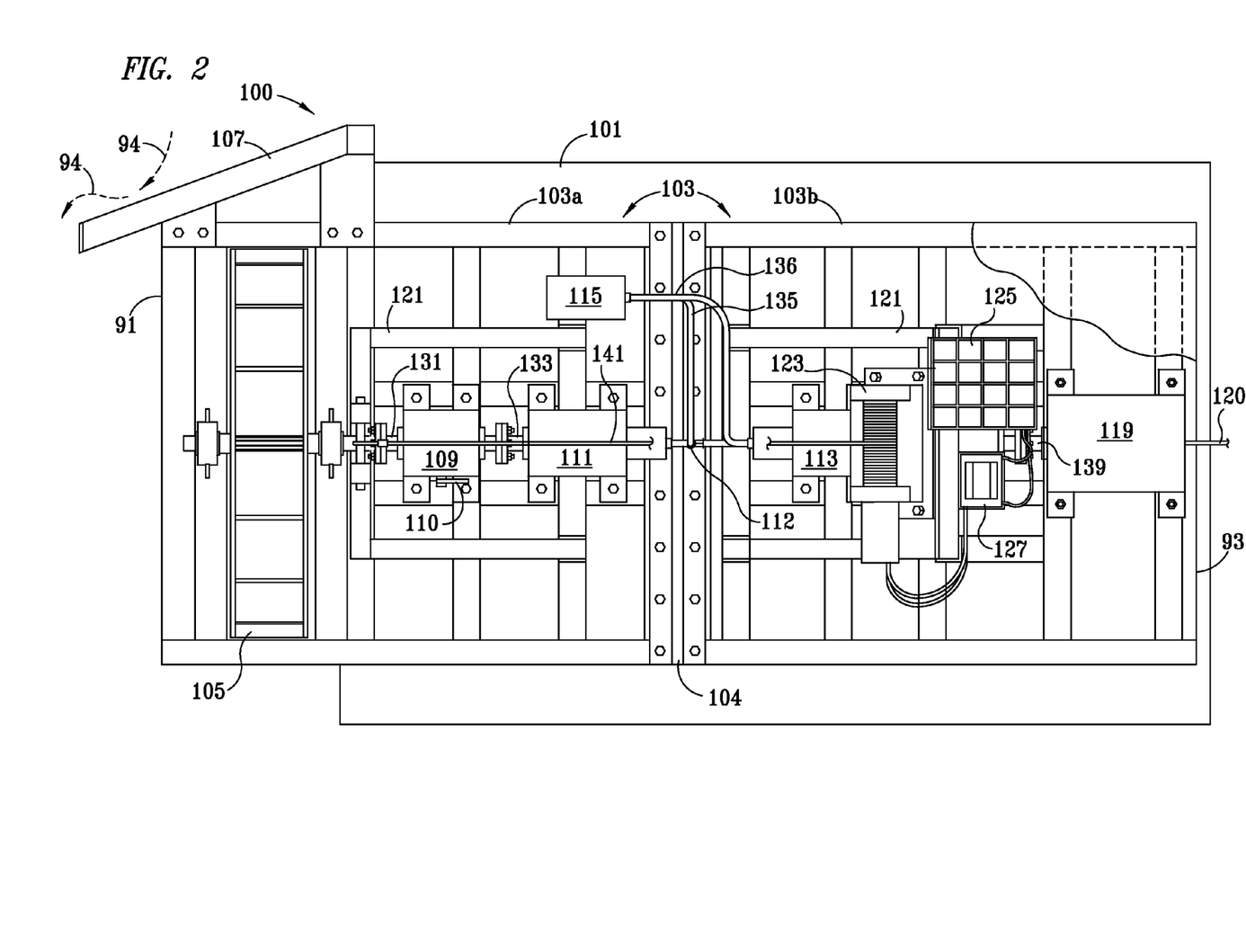
FIG. 2 is a plan view of the system of FIG. 1, taken along the line 2-2 of FIG. 1.

Referring to FIG. 2, a plan, or top-down, view of the system 100 is shown therein. The system 100 is illustrated as having a debris shield 107 attached to an upstream side of frame 103, thereby protecting the paddlewheel 105 from debris 96 (FIG. 3) and other matter that may flow down the river. As can be further seen from FIG. 2, the elements of the system 100 connected to various drive shafts are visible centered along frame 103, including the paddlewheel 105, first transmission 109, hydraulic pump 111, hydraulic motor 113, second transmission 117, and generator 119. The hydraulic fluid reservoir 115 is exemplified as being off-center and adjacent to the hydraulic motor 113.

Figure 3:
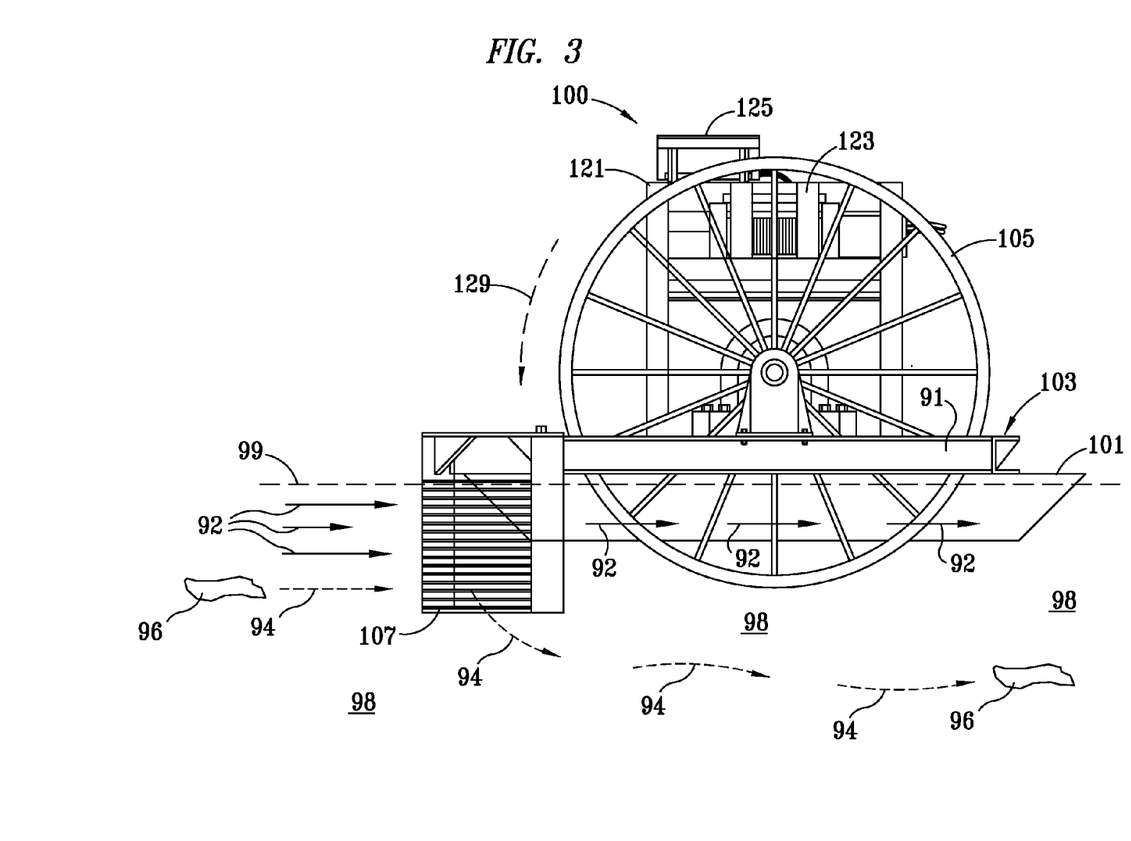
FIG. 3 is an end elevation view of the system of FIG. 1, taken along the line 3-3 of FIG. 1, illustrating the flow of water through the paddlewheel.

FIG. 3 depicts an elevation view of the first end 91 of the system 100. In this view, it can be seen that the diameter of the paddlewheel 105 preferably extends for a substantial portion of the width of the system 100. FIG. 3 better illustrates how the paddlewheel 105 engages the river or stream below the water line 99. As the water 98 flows downstream, it first engages and flows through debris shield 107, and due to the filtering nature of the debris shield 107, water flow passes in the direction of arrows 92 through debris shield 107 unabated to drive the paddlewheel 105. Debris 96 and other physical objects present in the water flow are preferably prevented from interfering with operation of the paddlewheel 105, and flow around the paddlewheel, as exemplified by the direction of arrows 94 (FIGS. 2 and 3).

In operation, the system 100 preferably floats in a river or stream close to the bank or other land mass 97. The system 100 is also preferably anchored, tethered, or otherwise prevented from flowing downstream due to the current of the river or stream. As water 98 flows in the direction of the arrows 92 (FIG. 3), debris 96 in the water is preferably diverted in the direction of arrows 94 (FIGS. 2 and 3) via the debris shield 107 from the paddlewheel 105, and the paddlewheel 105 is turned in the direction of the arrow 129 (FIG. 3). Rotation of the paddlewheel 105 drives the first transmission 109 via the drive shaft 131, which drives the hydraulic pump 111, which generates pressurized fluid. Pressurized fluid from the hydraulic pump 111 is transmitted via the fluid lines 135, 136 to the hydraulic motor 113. In a preferred embodiment, the pressurized fluid from the hydraulic pump 111 passes through the hydraulic fluid reservoir 115 which enables an operator to better control the function of the hydraulic motor 113. The hydraulic motor 113 drives the second transmission 117 via the third drive shaft 137, which drives the electric generator 119 via the fourth drive shaft 139. The electric generator 119 generates electrical current and transmits it via the power transmission lines 120 for use as desired to drive any of a number of different electrical devices well known in the art.

A benefit of mounting the electricity generating equipment on a barge as exemplified with the system 100 is that the operation of the system 100 will not be substantially affected regardless of the current overall water level of the river or stream. That is, the paddlewheel 105 will always engage the water 98 at the same position relative to the water line 99 when the portion 103a of the frame 103 is in a horizontal position. In a preferred embodiment of the invention, the paddlewheel 105 engages the water 98 at a position relative to the water line 99 such that approximately one-fourth of the length of paddlewheel 105 resides below the water line 99, and the remainder resides above water line 99.

Figure 4:
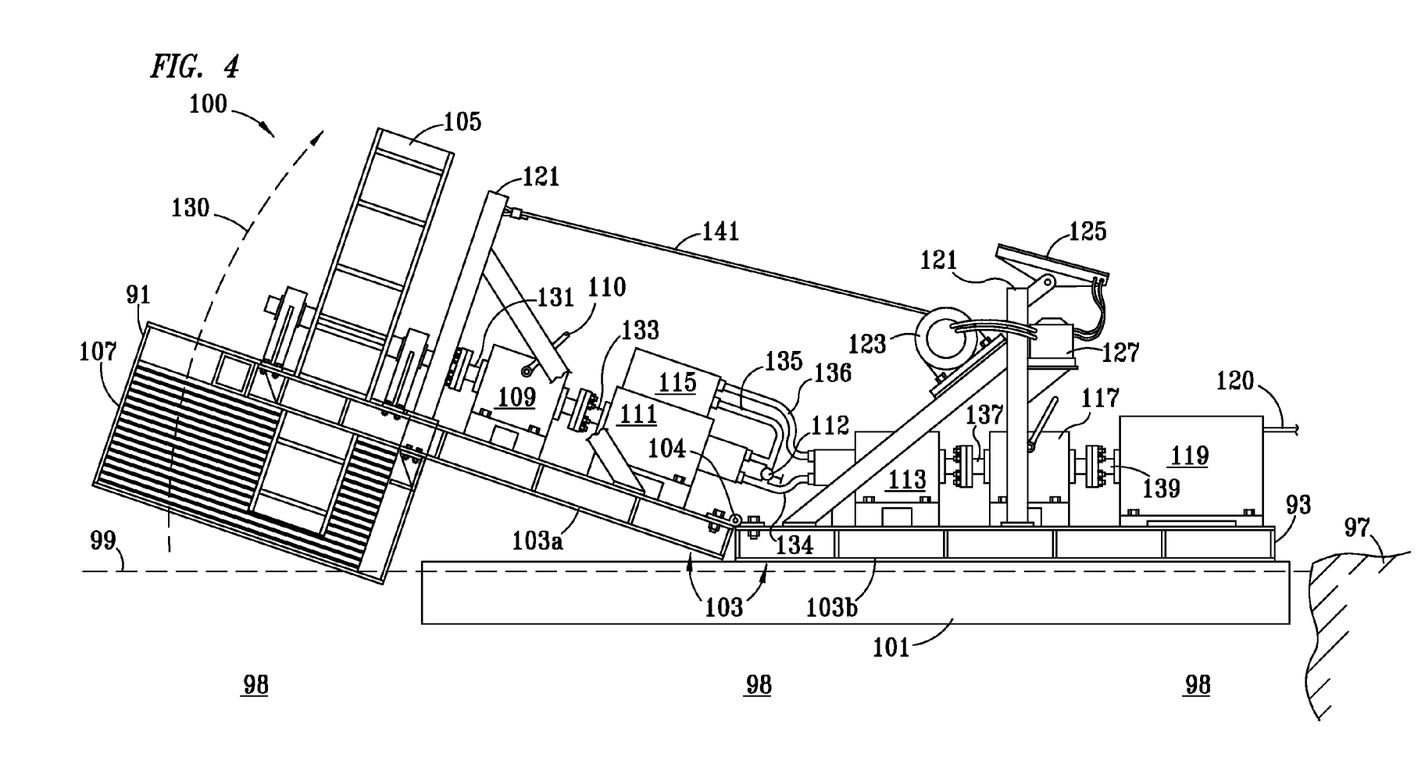
FIG. 4 is an elevation view of the system of FIG. 1, depicted with a portion of the frame in a lifted position.

Turning to FIG. 4, therein is shown a view of the system 100 with the optional hinge 104 of the frame 103 engaged such that the paddlewheel side of the frame 103 has been angularly lifted above the water line 99. The winch 123 has been used to reel in the guy wire 141 attached to the opposing upright support 121. As the winch 123 turns, the guy wire 141 pulls opposing upright support 121, thereby causing the entire first frame portion 103a, i.e., the paddlewheel side of frame 103, to rotate upwardly out of the water 98. The second frame portion 103b is preferably securely mounted to the barge 101 to facilitate the lifting of the first frame portion 103a. Furthermore, this illustrates the relatively lightweight nature of the paddlewheel 105 together with the first transmission 109 and the hydraulic pump 111, as otherwise, the system 100 may be rendered unstable due to the movement of the first frame portion 103a. In this position, an operator of the system 100 may access and maintain the paddlewheel 105, as well as a substantial portion of the debris shield 107, without having to enter the water 98. Another result of engaging the winch 123 to lift the paddlewheel 105 out of the water is to stop all rotational activity of the system 100 and therefore control the starting and stopping of electricity generation.

Structurally, the equipment located on the second frame portion 103b of the frame 103 remains unaffected by the upward movement of the first frame portion 103a. This is due to the unique placement of the equipment such that the fluid lines 135, 136 which connect the hydraulic pump, hydraulic motor, and hydraulic fluid reservoir are located over the hinge connection. Due to the flexibility of fluid lines 135, 136, the movement of the frame 103 will not adversely affect the structural arrangement of fluid lines 135, 136.

When the operator has completed maintenance activities on the paddlewheel 105 and/or the debris shield 107, or alternatively wishes to resume electricity generation, the winch 123 is reengaged to unreel the guy wire 141, thereby returning the frame 103 to its original position and settling the paddlewheel 105 and debris shield 107 back below the water line 99.

Figure 5:
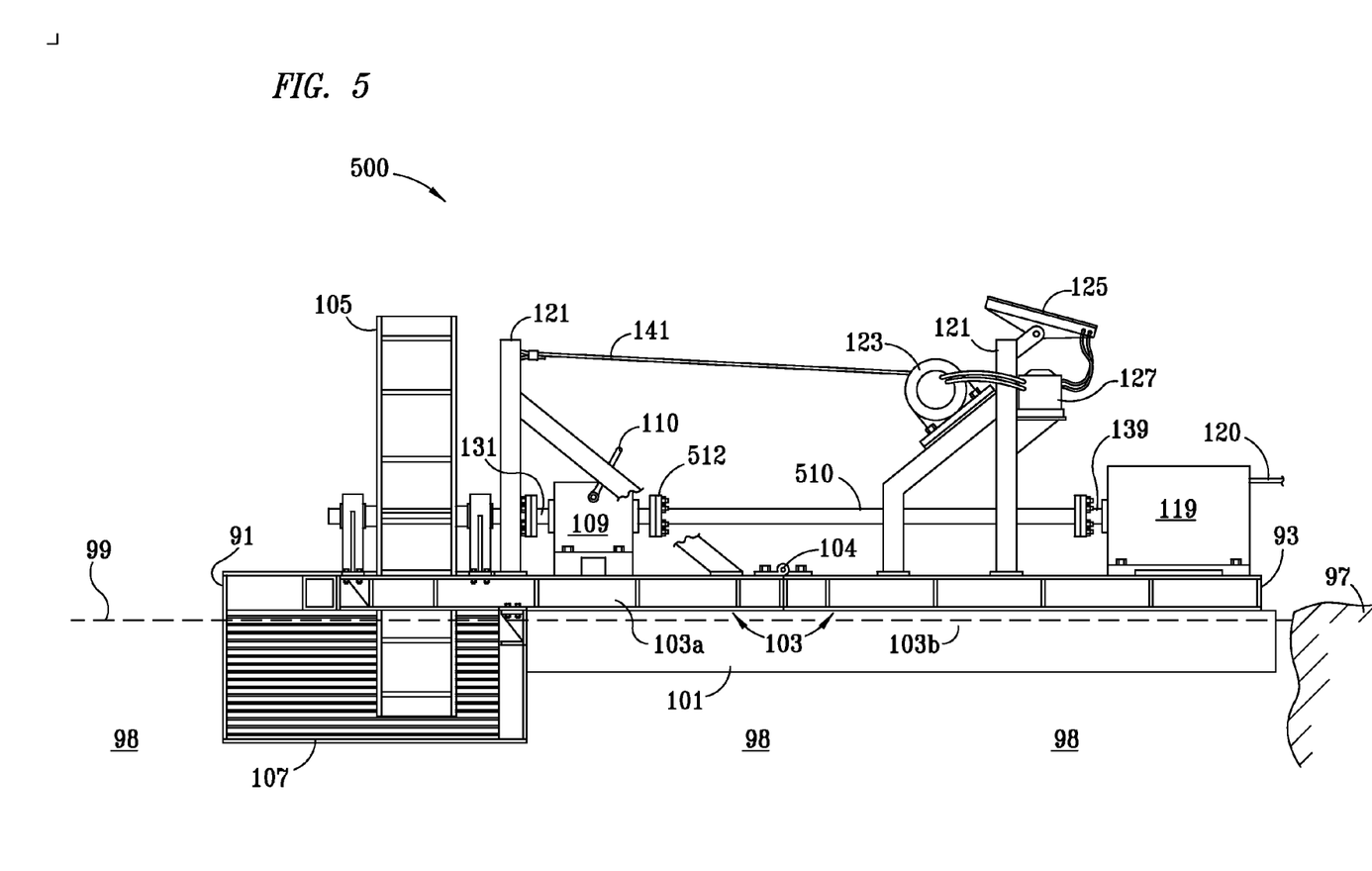
FIG. 5 is an elevation view of an alternate embodiment of the system of FIG. 1, wherein the paddlewheel drives a gearbox which is connected via a shaft to an electric generator.

FIG. 5 exemplifies an alternative embodiment of the invention, designated by the reference numeral 500, in which the first transmission 109 is coupled directly to the generator 119 via a shaft 510, thereby obviating the need for the hydraulic pump 111, hydraulic fluid reservoir 115, hydraulic motor 113, and second transmission 117, though the second transmission 117 may be included if desired to better control the RPM and torque driving the generator 119. Operation of the embodiment 500 is similar as described above, but for delivering power to the generator 119 via the shafts 510 instead of hydraulically, and but for rotation of the second portion 103a of frame 103. If it is desired to rotate upwardly the second portion 103a of the frame 103 as described above, then in preparation for same, the clutch (not shown) of the transmission 109 would preferably be disengaged so that the shaft 510 would discontinue rotation and could be removed from between the transmission 109 and the generator 119.

Figure 6:
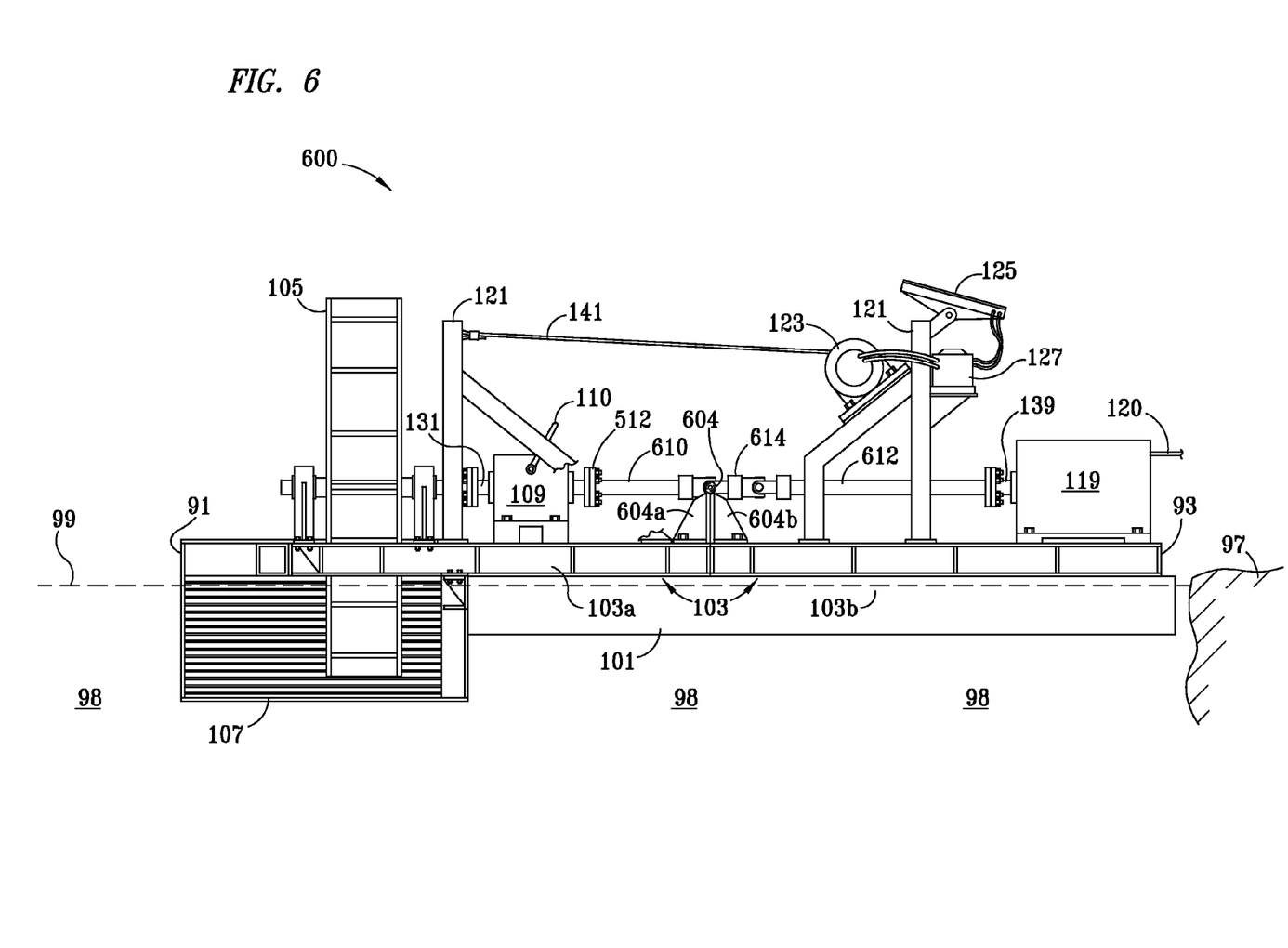
FIG. 6 is an elevation view of an alternate embodiment of the embodiment of FIG. 5 in which the hinge of the frame is elevated and the shaft includes a U-joint which rotates in the same axis as the frame.

FIG. 6 exemplifies an alternative embodiment of the invention 500, the alternative embodiment being designated by the reference numeral 600, in which the shaft coupling the transmission 109 to the generator 119 comprises two portions 610 and 612 coupled together via a U-joint 614 that allows the shaft to be rotated about a horizontal axis perpendicular to the axis of the shaft. The hinge 104 of the earlier embodiments, designated by the reference numeral 604 in the embodiment 600, is elevated to rotate about the same axis as the U-joint 614. Operation of the embodiment 600 is similar as described above with respect to the system 100, but for delivering power to the generator 119 via the shaft 610 and 612 instead of hydraulically.

It is understood that the present invention may take many forms and embodiments. Accordingly, several variations may be made in the foregoing without departing from the spirit or the scope of the invention. For example, the generator 119 may be connected directly to the paddlewheel 105, or it may be positioned in place of the hydraulic pump 111 and driven directly by the first transmission 109, thereby obviating the hydraulic pump 111, hydraulic motor 113, second transmission 117, and related items such as drive shafts and the fluid lines 135, 136. In another variation, the system may be constructed without the frame, wherein all components previously mounted on the frame are instead mounted directly to the barge.

It will be readily apparent to those skilled in the art that the general principles defined herein may be applied to other embodiments and applications without departing from the spirit and scope of the present invention. Having thus described the exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is contemplated that the appended claims will cover any such modifications or embodiments that fall within the true scope of the invention.

What is claimed is:

1. A system for generating electricity, the system comprising:
   a barge;
   a frame mounted on the barge, wherein the frame defines a first portion of the frame and a second portion of the frame, the first and second portions being hingedly connected together such that the first portion may swing upwardly relative to the barge;
   a paddlewheel rotationally mounted on the first portion of the frame;
   an electric generator mounted on the second portion of the frame;
   means for coupling the paddlewheel to the generator for driving the generator for generating electricity;
   an upright support mounted on each of the first and second portions of the frame;
   a guy wire coupling together the upright supports; and
   a winch configured for reeling in or extending the length of guy wire between the upright supports, such that the first portion of the frame swings upwardly relative to the barge when the guy wire is reeled in by the winch.

2. The system of claim 1, wherein the means comprises a shaft coupling the paddlewheel to the generator for driving the generator.

3. The system of claim 1, wherein the means comprises:
   a transmission mounted on the first portion of the frame and coupled to the paddlewheel; and
   means coupling the transmission to the generator for driving the generator.

4. The system of claim 1, wherein the means comprises:
   a first transmission mounted on the first portion of the frame and coupled to the paddlewheel;
   a hydraulic pump mounted on the first portion of the frame and coupled to the first transmission;
   a hydraulic motor mounted on the second portion of the frame and in fluid communication with the hydraulic pump; and
   a second transmission mounted on the second portion of the frame for coupling the hydraulic motor to the generator for driving the generator.

5. The system of claim 1, further comprising a debris shield mounted on the frame and adjacent the paddlewheel for preventing debris in the water from interfering with operation of the paddlewheel.

6. The system of claim 1, further comprising a debris shield mounted on the frame and adjacent the paddlewheel, the debris shield positioned upstream of the paddlewheel and below a water line for preventing debris in the water from interfering with operation of the paddlewheel.

7. The system of claim 4, further comprising a hydraulic fluid reservoir coupled in fluid communication between the hydraulic motor and the hydraulic pump.

8. The system of claim 1, further comprising:
   a solar panel and a battery located on the second portion of the frame for providing power to the winch.

9. The system of claim 1, further comprising an anchor assembly for tethering the barge to a fixed location on a body of water.

10. A method for generating electricity, the method comprising steps of:
    providing a barge;
    providing a frame mounted on the barge, wherein the frame defines a first portion of the frame and a second portion of the frame, the first and second portions being hingedly connected together such that the first portion may swing upwardly relative to the barge;
    providing a paddlewheel rotationally mounted on the first portion of the frame;
    providing an electric generator mounted on the second portion of the frame;
    providing a means for coupling the paddlewheel to the generator for driving the generator for generating electricity;
    providing an upright support mounted on each of the first and second portions of the frame;
    providing a guy wire coupling together the upright supports;
    providing a winch configured for reeling in or extending the length of guy wire between the upright supports, such that the first portion of the frame swings upwardly relative to the barge when the guy wire is reeled in by the winch;

reeling in the guy wire with the winch so that the first portion of the frame, including the paddlewheel, swings upwardly relative to the barge;

releasing the guy wire from the winch so that the first portion of the frame, including the paddlewheel, swings downwardly relative to the barge and enter a body of moving water until the paddlewheel is turned by the moving water; and driving an electric generator by the paddlewheel thereby generating electricity.

11. The method of claim 10, wherein the step of driving comprises driving a shaft connecting the paddlewheel to the generator.

12. The method of claim 10, wherein the step of driving comprises steps of:
   driving a transmission by the paddlewheel;
   driving a shaft by the transmission; and
   driving the generator by the transmission.

13. The method of claim 10, wherein the step of driving comprises steps of:
   driving a first transmission by the paddlewheel;
   driving a hydraulic pump by the first transmission;
   driving a hydraulic motor by the hydraulic pump;
   driving a second transmission by the hydraulic motor; and
   driving the generator by the second transmission.

14. The method of claim 10, further comprising positioning a debris shield adjacent to and in the body of water upstream of the paddlewheel for preventing debris in the water from interfering with operation of the paddlewheel.

15. The method of claim 10, further comprising a step of tethering the barge to a fixed location on the body of water.

\* \* \* \* \*